(12) United States Patent
Xiao

(10) Patent No.: US 12,486,105 B2
(45) Date of Patent: Dec. 2, 2025

(54) ENVIRONMENTAL PROTECTION STORAGE DEVICE

(71) Applicant: TAIZHOU SUKK TECHNOLOGY CO., LTD, Taizhou (CN)

(72) Inventor: Shuangshuang Xiao, Taizhou (CN)

(73) Assignee: TAIZHOU SUKK TECHNOLOGY CO., LTD, Taizhou (CN)

( * ) Notice: Subject to any disclaimer, the term of this patent is extended or adjusted under 35 U.S.C. 154(b) by 118 days.

(21) Appl. No.: 18/481,346

(22) Filed: Oct. 5, 2023

(65) Prior Publication Data
US 2025/0058966 A1     Feb. 20, 2025

(30) Foreign Application Priority Data
Aug. 16, 2023   (CN) .......................... 202322217582.6

(51) Int. Cl.
*B65F 1/06*   (2006.01)
*B65F 1/14*   (2006.01)

(52) U.S. Cl.
CPC . *B65F 1/06* (2013.01); *B65F 1/14* (2013.01)

(58) Field of Classification Search
CPC ............ Y02W 30/10; B65F 1/06; B65F 1/065
USPC ....................... 220/23.4, 909, 1.28
See application file for complete search history.

(56) References Cited

U.S. PATENT DOCUMENTS

| | | | | |
|---|---|---|---|---|
| 3,211,367 | A | * | 10/1965 | Jessop .................... B65F 1/1478 232/43.2 |
| 3,807,598 | A | * | 4/1974 | Nutt .......................... B65F 1/06 220/495.08 |
| 4,962,973 | A | * | 10/1990 | Allmon .................. B65F 1/1426 312/274 |
| 5,683,030 | A | * | 11/1997 | Moore ................... B65F 1/0053 209/706 |
| 8,074,824 | B1 | * | 12/2011 | Roby-Wilson .......... B65F 1/068 220/495.08 |
| 11,608,208 | B2 | * | 3/2023 | Leng .................. B65D 11/1873 |
| 2023/0076758 | A1 | * | 3/2023 | Nowicky ............... B65D 88/54 |

* cited by examiner

*Primary Examiner* — Stephen J Castellano

(57) ABSTRACT

An environmental protection storage device includes a plurality of environmental protection storage units and a plurality of connecting pieces. Each of the environmental protection storage unit includes a plurality of connecting parts. Each of the connecting pieces are configured for connecting the connecting parts of adjacent two of the environmental protection storage units, thereby the environmental protection storage units are interconnected. is provided, which includes.

6 Claims, 18 Drawing Sheets

ENVIRONMENTAL PROTECTION STORAGE DEVICE

FIELD OF THE INVENTION

The present invention relates to the technical field of environmental protection storage devices, and more particularly to an environmental protection storage device with detachable connections.

BACKGROUND OF THE INVENTION

Environmental protection storage devices, also known as waste bins or garbage bins, refer to containers for storing garbage, mostly made of metal or plastic. Various environmental protection storage devices are in public places such as streets and parks, however, traditional environmental protection storage devices are not conducive to the classification, recycling, and reuse of garbage when all the garbage is stored together. Although there are various types of environmental protection storage devices available on the market, However, these environmental protection storage devices are separated from each other and have poor independent stability, they are prone to dumping in harsh weather such as strong winds, and even shake back and forth when placing heavy garbage, resulting in a change in position, which is not conducive to people's use.

SUMMARY OF THE INVENTION

(1) Solved Technical Problem

In order to resolve the above problem, the invention relates to an environmental protection storage device with detachable combinations, in which environmental protection storage units can be detachably interconnected, forming various combinations to enhance stability.

(2) Technical Solution

To achieve the above purpose, the present invention provides the following technical solution:

An environmental protection storage device includes a plurality of environmental protection storage units and a plurality of connecting pieces. Each of the environmental protection storage unit includes a plurality of connecting parts. Each of the connecting pieces are configured for connecting the connecting parts of adjacent two of the environmental protection storage units, thereby the environmental protection storage units are interconnected.

(3) Beneficial Effects

Compared with the prior art, the present invention brings the following beneficial effects:

In practical use, the environmental protection storage device can be interconnected to multiple environmental protection storage devices through the mutual connection and coordination of the connecting parts on different environmental protection storage units, as both the first and second ends of the connecting piece can be disassembled to connect the connecting parts on the environmental protection storage units. This enhances the overall stability of the environmental protection storage device and makes it less prone to tipping when encountering adverse weather conditions such as strong winds, and when placing heavy garbage, it will not sway back and forth, avoiding a change in position, making it more convenient for people to use the environmental protection storage devices. Overall, by using this interconnected environmental protection storage device, multiple environmental protection storage devices can be connected to each other, resulting in stronger stability.

BRIEF DESCRIPTION OF THE DRAWINGS

The accompanying drawings are used to provide a further understanding of the present invention, and constitute a part of the description, and are used to explain the present invention together with the embodiments of the present invention, and do not constitute a limitation to the invention model. In the attached drawings.

Figure 1:
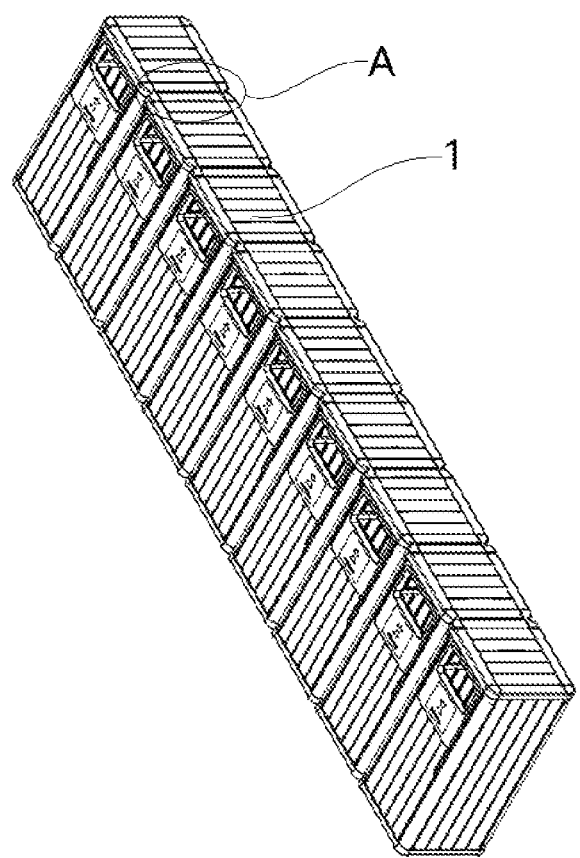
FIG. 1 is a schematic structural view of an environmental protection storage device according to an embodiment of the present invention.
Figure 2:
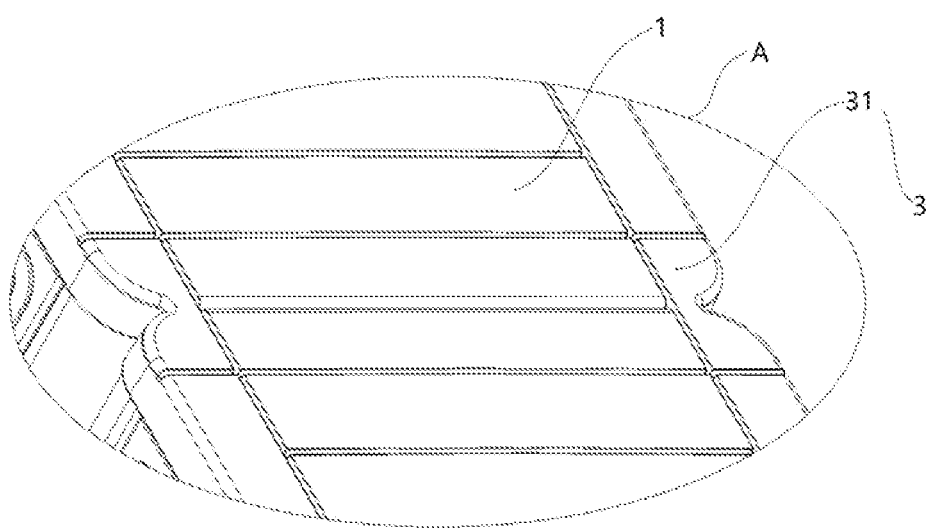
FIG. 2 is an enlarged view of A part of FIG. 1 according to the embodiment of the present invention.

Labels in the drawings: 1, environmental protection storage unit; 11, bucket body; 111, first opening; 112, side plate; 113, top plate; 114, bottom plate; 12, cover; 13, second opening; 2, connecting part; 21, first connecting part; 22, second connecting part; 3, connecting piece; 31, first connecting piece; 32, second connecting piece; 4, limiting block; 5, clamping protrusion; 6, clamping strip; 7, supporting piece; 71, vertical connecting hole; 8, frame; 81, connecting rod; 9, clamping part; 91, slot; 92, clamping block.

DETAILED DESCRIPTION OF PREFERRED EMBODIMENTS

The following description will refer to the accompanying drawings to more fully describe the contents of the present application. It is apparent that here only constitutes a part of the embodiments of the present invention, not all of the embodiments. Based on the embodiments of the present invention, all other embodiments obtained by persons of ordinary skill in the art without making creative efforts belong to the protection scope of the present invention.

Referring to FIG. 1 to FIG. 18, an environmental protection storage device according to an embodiment of present invention is provided. The environmental protection storage device includes a plurality of environmental protection storage units 1, and a plurality of connecting piece 3 configured for connecting the environmental protection storage units 1.

The plurality of environmental protection storage units 1 can be arranged in a row or arranged in a particular pattern, and each of the environmental protection storage units 1 has a plurality of connecting parts 2. The connecting pieces 3 are detachably connected to the corresponding connecting parts 2 of adjacent two environmental protection storage units 1.

In practical use, the environmental protection storage units 1 can be interconnected to multiple environmental protection storage units 1, or the environmental protection storage device can be interconnected to multiple environmental protection storage devices through the mutual connection and coordination of the connecting parts 2 on different environmental protection storage units 1, and the connecting pieces 3 detachably connect the connecting parts 3 on the environmental protection storage units 1. This enhances the overall stability of the environmental protection storage device and makes it less prone to tipping when encountering adverse weather conditions such as strong winds, and when placing heavy garbage, it will not sway back and forth, avoiding a change in position, making it more convenient for people to use the environmental protection storage devices. Overall, by using this interconnected environmental protection storage device, multiple environmental protection storage devices can be connected to each other, resulting in stronger stability.

Text and pattern markings can also be placed on the environmental protection storage units 1 in the form of paintings or stickers, reminding those who dispose of garbage to separate different types of garbage into corresponding environmental storage devices, in order to achieve the goal of garbage classification and disposal.

The environmental protection storage units 1 can be made of imitation wood materials in actual production. Traditional wooden environmental protection storage devices are prone to mold, cracking, and decay after long-term use, have a short lifespan, high cost, and can affect ecological balance. However, plastic environmental protection storage devices commonly seen on the market are lightweight and easy to topple, even if multiple plastic environmental protection storage devices are connected together, resulting that the stability is not high enough. Therefore, the preferred material for the environmental protection storage units 1 in this embodiment is imitation wood material. There are various types of imitation wood materials, such as ceramic imitation wood, metal imitation wood, etc., which can be selected based on their own characteristics. Furthermore, these imitation wood materials are not only cost-effective, beautiful in appearance, higher in effective utilization rate than solid wood, heavier in weight than plastic, but also have various excellent characteristics such as flame retardancy, anti-corrosion, and durability, resulting that the environmental protection storage devices made of imitation wood materials has strong resistance to nature and is suitable for long-term outdoor use.

Referring to FIGS. 5, 6, 15 and 18, in this embodiment, the connecting parts 2 each are in the form of a groove, while the connecting pieces 3 each are in the form of two protrusions on a plate body, and more particularly, the two protrusions are on a first end and an opposite second end of the plate body. By inserting the protrusion into the groove in an interference fit, the connection between different environmental protection storage units 1 can be achieved. When using this structure for connection, a gap between adjacent environmental protection storage units can also be adjusted by changing the position of the connecting part 2 or the length of the connecting piece 3, in order to facilitate people's placement and use according to the actual terrain. Furthermore, there are various structures of the connecting part 2 and the connecting piece 3 that have the above functions, and they will not be elaborated here.

Figure 5:
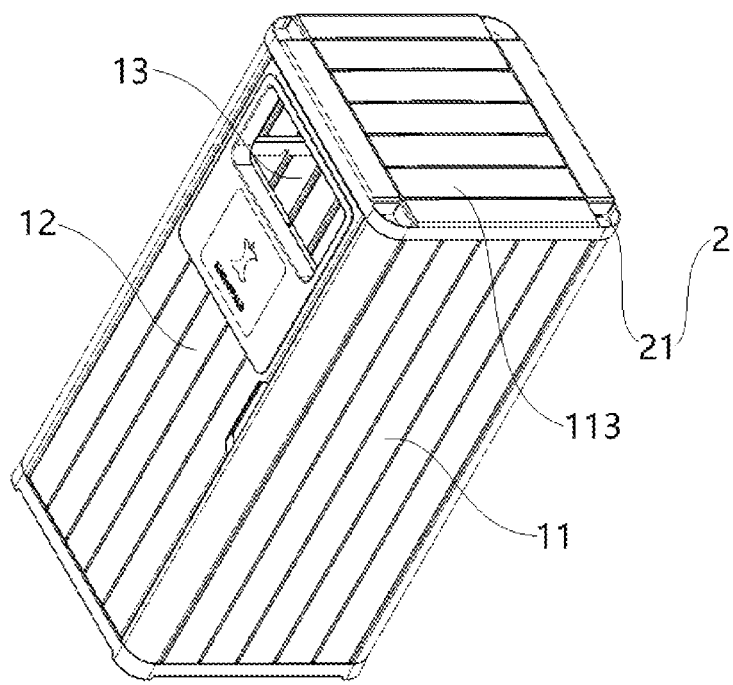
FIG. 5 is a schematic structural view of a single environmental protection storage unit according to the embodiment of the present invention.
Figure 6:
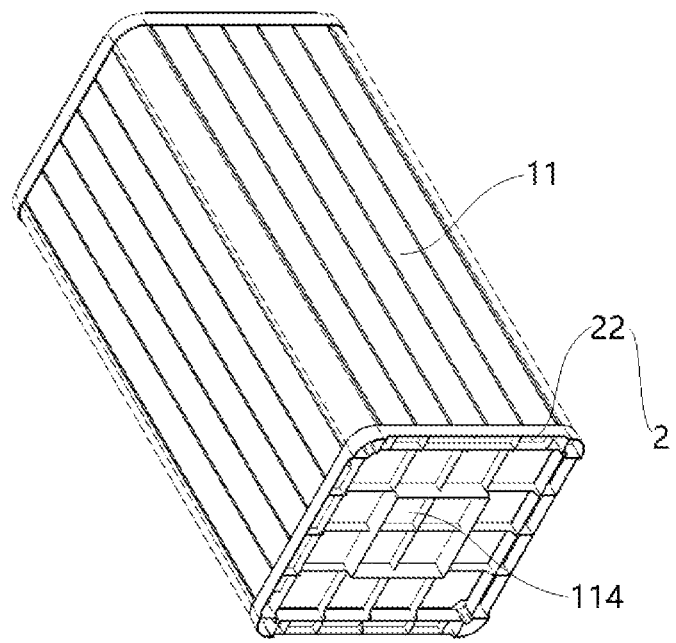
FIG. 6 is another schematic structural view of the environmental protection storage unit according to the embodiment of the present invention.
Figure 7:
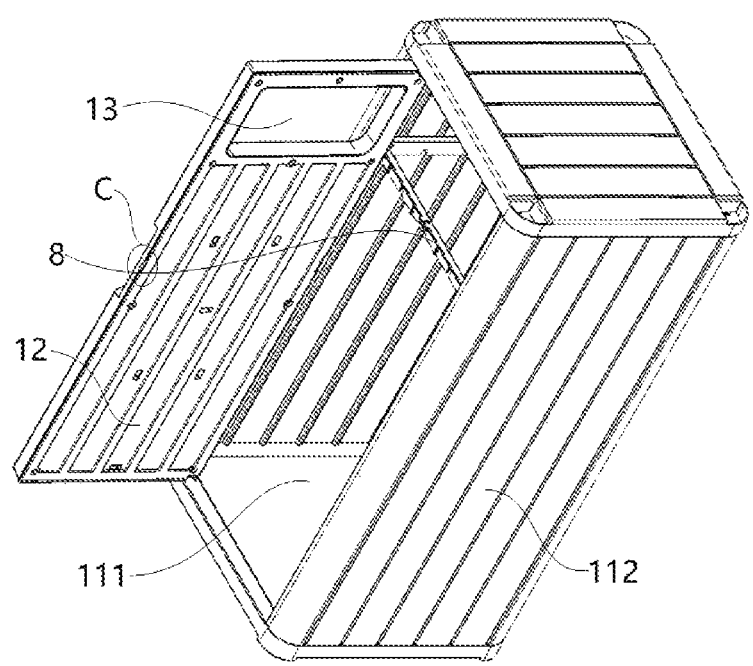
FIG. 7 is a schematic structural view of the environmental protection storage unit when a cover is open according to the embodiment of the present invention.
Figure 8:
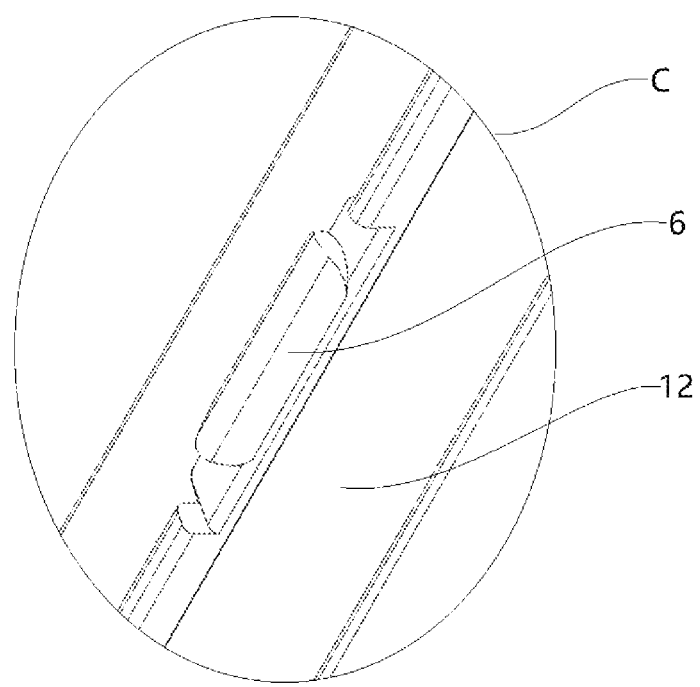
FIG. 8 is an enlarged view of C part of FIG. 7 according to the embodiment of the present invention.

Referring to FIGS. 5-7, there are various forms of environmental protection storage devices, and in order to facilitate users to dispose of garbage, the structure of this embodiment has been designed as follows. Specifically, the environmental protection storage unit 1 includes a bucket body 11, a cover 12, and a second opening 13, and a side of the bucket body 11 is provided with a first opening 111. The cover 12 can be detachably connected to the bucket body 11 and corresponding to the first opening 111, for opening and closing the first opening 111. The second opening 13 is arranged on the cover 12 for throwing garbage. Based on the above scheme, garbage can be placed into bucket body 11 through the second opening 13, which is convenient for use. When there is a large amount of stored garbage, the cover 12 can be opened for cleaning, which is convenient for workers to operate. At the same time, since the second opening 13 is located on the side of the environmental protection storage unit 1, rainwater and other objects will not easily enter the environmental protection storage unit 1, which will affect the storage of garbage.

Referring again to FIGS. 5-7, the structure of the bucket body 11 also has various forms, and the present embodiment introduces one of them. Specifically, the bucket body 11 includes three side plates 112, a top plate 113, and a bottom plate 114. The three side plates 112 are vertically arranged, and adjacent side plates 112 can be detachably connected and perpendicular to each other. The top plate 113 can be detachably connected to the top of three side plates 112, and the bottom plate 114 can be detachably connected to the bottom of the three side plates 112. The bottom plate 114, in conjunction with the top plate 113 and the three side plates 112, can enclose a rectangular accommodating space for accommodating garbage remaining an opening at the side of the cover 12. Based on the above design, the bucket body 11 can be disassembled as a whole, and any damaged components can be easily replaced without affecting the normal use of the bucket body 11. At the same time, during storage, each component can be disassembled for placement, reducing space occupation.

Referring to FIGS. 1 to 6, the specific position and quantity of the connecting part 2 are not limited in present invention. In order to make different environmental protection storage devices more stable after being connected to each other, the following design has been carried out in this embodiment. Specifically, the connecting piece 3 includes a first connecting piece 31 and a second connecting piece 32, and the connecting part 2 includes a first connecting part 21 and a second connecting part 22, and the first connecting part 21 is arranged on the top plate 113. The first connecting parts 21 on different adjacent environmental protection storage units 1 are connected through the first connecting piece 31. The second connecting part 22 is arranged on the bottom plate 114, and the second connecting parts 22 on different adjacent environmental protection storage units 1 are connected through the second connecting piece 32. By connecting the top and bottom surfaces of different environmental protection storage units 1 separately, the number of connections is increased while also increasing the connection area, making the connection between different environmental storage devices more secure.

Figure 4:
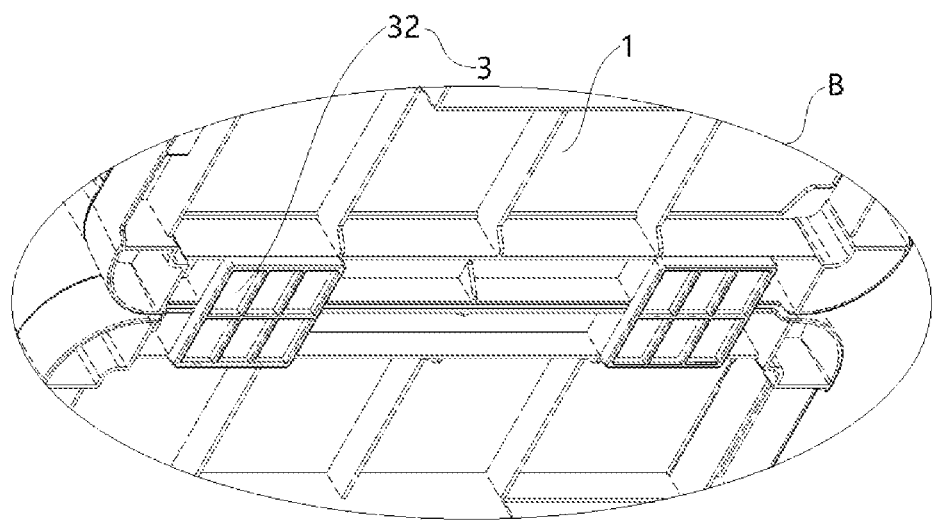
FIG. 4 is an enlarged view of B part of FIG. 3 according to the embodiment of the present invention.

Referring to FIG. 4, since the second connecting piece 32 is located at the bottom of the environmental protection storage unit 1, and the second connecting piece 32 has a thickness, in order to prevent the entire environmental protection storage device from tilting, in the actual manufacturing process, multiple support feet will be installed at the bottom of the bottom plate 114 to prevent the second connecting piece 32 from directly contacting the ground.

It should be noted that not only the top and bottom of environmental protection storage unit 1 can be connected, but also the top and side connections can be used. It is not only possible to connect on two surfaces, but also through a combination of top connection, bottom connection, and side connection. The above scheme can be selected and used according to the actual situation.

Figure 3:
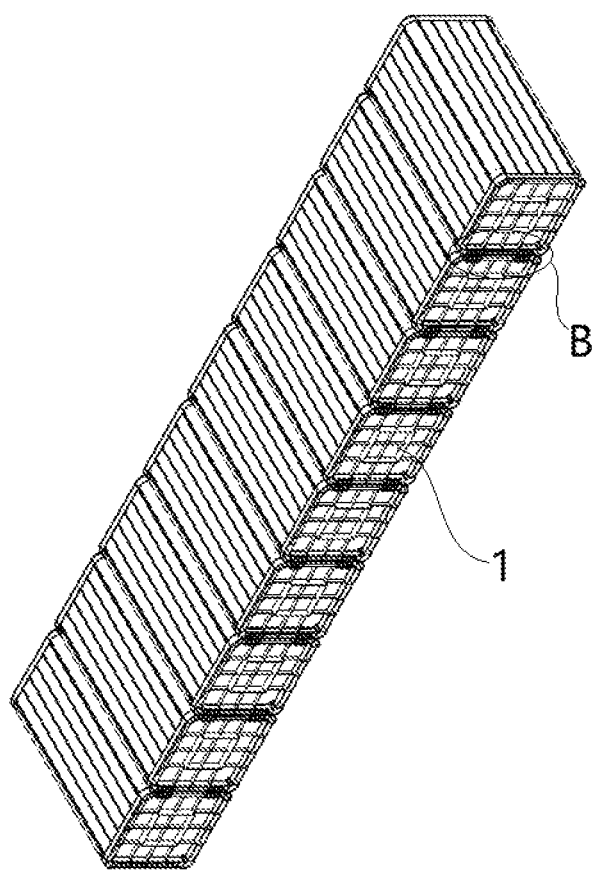
FIG. 3 is another schematic structural view of the environmental protection storage device according to the embodiment of the present invention.

Referring to FIGS. 1 and 3, when the position and shape of the connecting part 2 are relatively regular, such as when the connecting part 2 is set at the four corners of the environmental protection storage unit 1 and a cross section of the connecting part 2 is a quarter circle, different sides of the environmental protection storage device can be connected as needed. For example, the environmental protection storage units 1 can be connected to each other in a shape such as in a row shape or a T-shape, and different environmental protection storage devices can also be connected into patterns that have ornamental value or are convenient for users to dispose of garbage. In the present embodiment, the attached drawings in the instruction manual only show the environmental protection storage devices arranged in a row, while the patterns composed of other layout schemes are not shown. In addition, for the connecting part 2 on the environmental protection storage unit 1 that is not connected to other environmental protection storage units 1, it can be blocked by a specially designed half connecting part 3.

Figure 9:
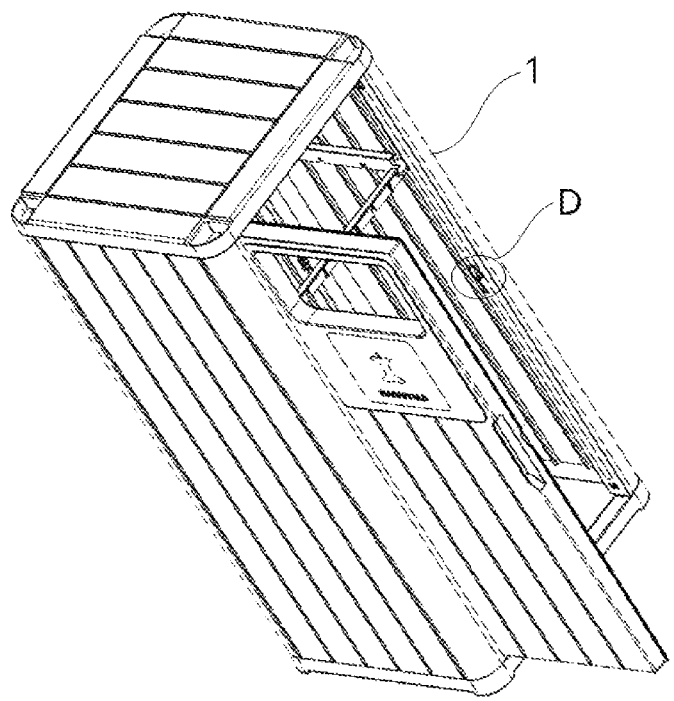
FIG. 9 is another schematic structural view of the environmental protection storage unit when a cover is open according to the embodiment of the present invention.
Figure 10:
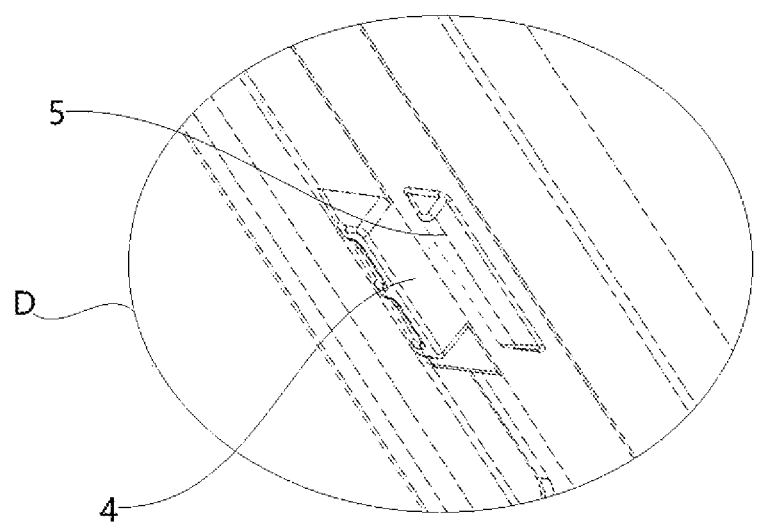
FIG. 10 is an enlarged view of D part of FIG. 9 according to the embodiment of the present invention.

Referring to FIGS. 7 and 9, in order to facilitate the opening and closing of the cover 12, the following design has been carried out in this embodiment. Specifically, one side of the cover 12 is rotationally connected to the bucket body 11, and the opposite side is buckle connected to the bucket body 11.

Referring to FIGS. 7 to 10, a detailed design has been carried out for the buckle connection between the cover 12 and the bucket body 11 in this embodiment. Specifically, at the first opening 111, a limiting block 4 and a clamping protrusion 5 are provided, and the limiting block 4 and the clamping protrusion 5 are arranged parallel to each other and spaced from each other. The cover 12 is provided with a clamping strip 6 corresponding to the clamping protrusion 5, and at least one of the clamping strips 6 and the clamping protrusion 5 is made of elastic material, Enable the clamping strip 6 to move between the limiting block 4 and the clamping protrusion 5 as the cover body 12 rotates.

The clamping protrusion 5 is made of elastic material. In order to prevent excessive wear and tear during the opening and closing process of the cover 12, the clamping protrusion 5 can be set on a plate body, making it detachable and connected to the bucket body 11, thus the clamping protrusion 5 can be quickly replaced, thereby extending the service life of the entire environmentally friendly storage device.

Figure 11:
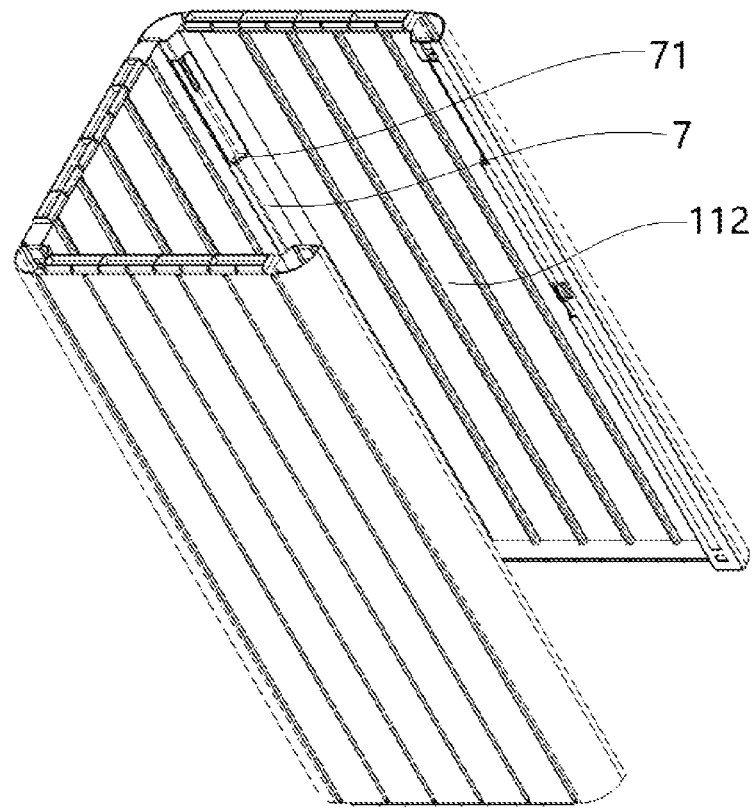
FIG. 11 is a schematic partial view of a bucket body of the environmental protection storage unit according to the embodiment of the present invention.

Referring to FIG. 7 and FIG. 11, although relying solely on the environmental protection storage unit 1 can also accommodate garbage, it is not only difficult to clean after long-term use, but also prone to odor. In order to solve the above problems, the following design has been carried out in this embodiment. Specifically, a plurality of supporting pieces 7 and a frame 8 are also included, and the multiple supporting pieces 7 are respectively arranged at multiple edges and corners within the bucket body 11, there is a gap arranged between the top of the supporting piece 7 and the top of the bucket body 11, and corresponding to the bottom of the second opening 13. The frame 8 can be detachably connected to the supporting piece 7 for installing garbage bags. Based on the above scheme, the garbage bag can be first placed on the frame 8, and then fixed on the supporting piece 7 inside the bucket body 11, which is convenient and fast, and can effectively prevent garbage from polluting the inner wall of the bucket body 11.

Figure 14:
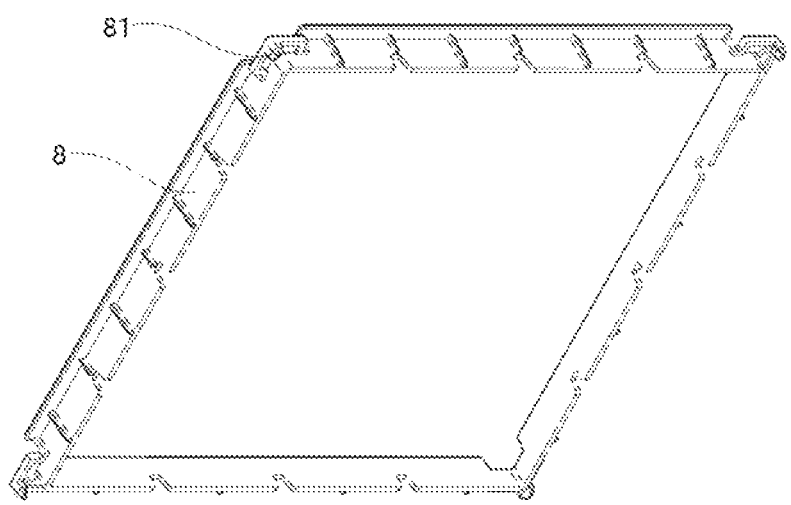
FIG. 14 is another schematic structural view of the frame of the environmental protection storage unit according to the embodiment of the present invention.
Figure 15:
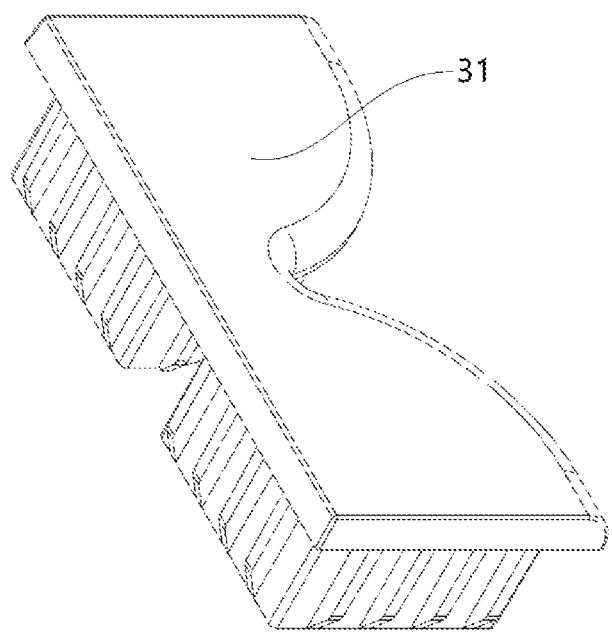
FIG. 15 is a schematic structural view of a first connecting piece according to the embodiment of the present invention.
Figure 16:
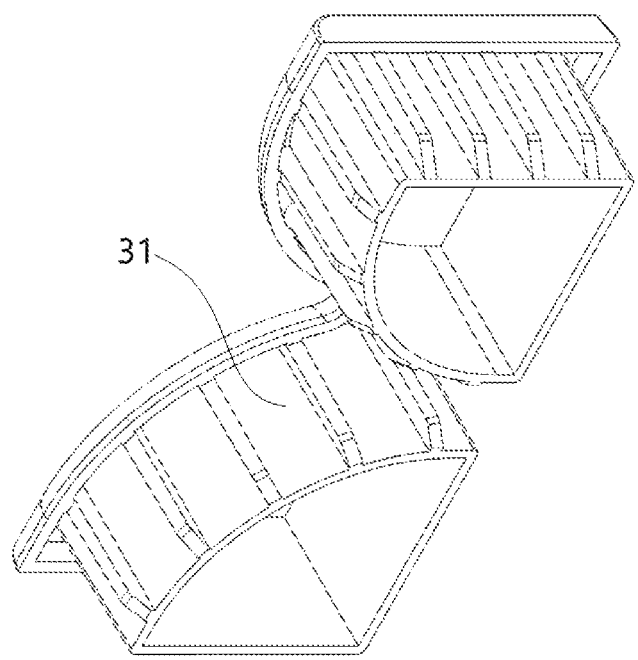
FIG. 16 is another schematic structural view of the first connecting piece according to the embodiment of the present invention.
Figure 17:
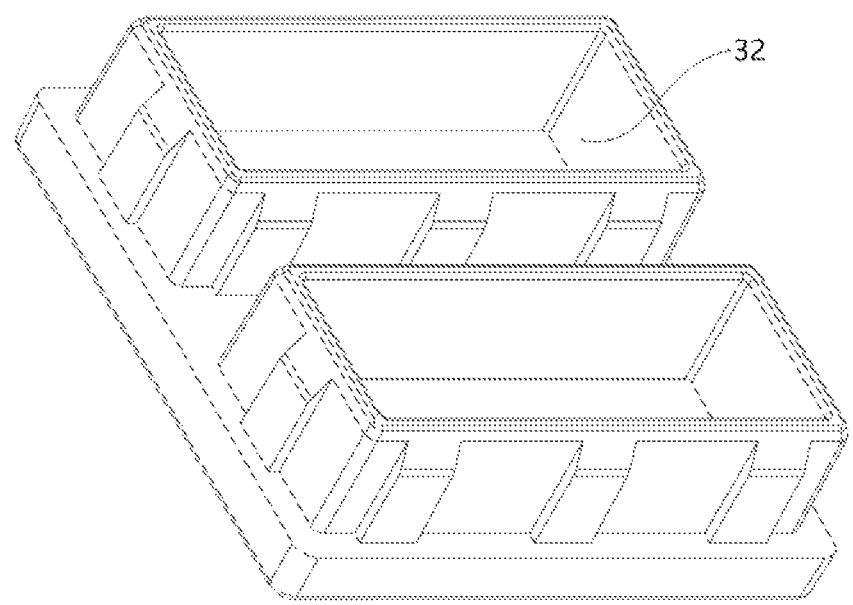
FIG. 17 is a schematic structural view of a second connecting piece according to the embodiment of the present invention.
Figure 18:
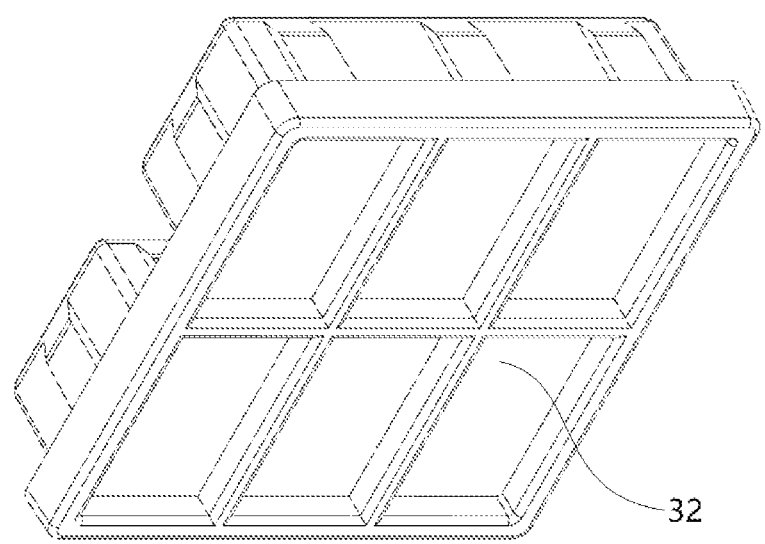
FIG. 18 is another schematic structural view of the second connecting piece according to the embodiment of the present invention.

Referring to FIG. 11 and FIG. 14, in order to facilitate faster disassembly and assembly of the frame 8, the following design has been carried out in this embodiment. Specifically, a middle of the supporting piece 7 is provided with a vertical connecting hole 71, and the bottom of the frame 8 is provided with a connecting rod 81 corresponding to the connecting hole 71. The connecting rod 81 can be inserted into the connecting hole 71 to allow the frame 8 and the supporting piece 7 to be inserted and pulled out and connected. In addition, the garbage bag can have a folding part at an edge thereof, and the folding part can also be covered on the connecting rod 81, and then the connecting rod 81 can be inserted into the connecting hole 71. This not only makes the connection between the frame 8 and the supporting piece 7 more secure, but also prevents the garbage bag from falling off the frame 8.

Figure 12:
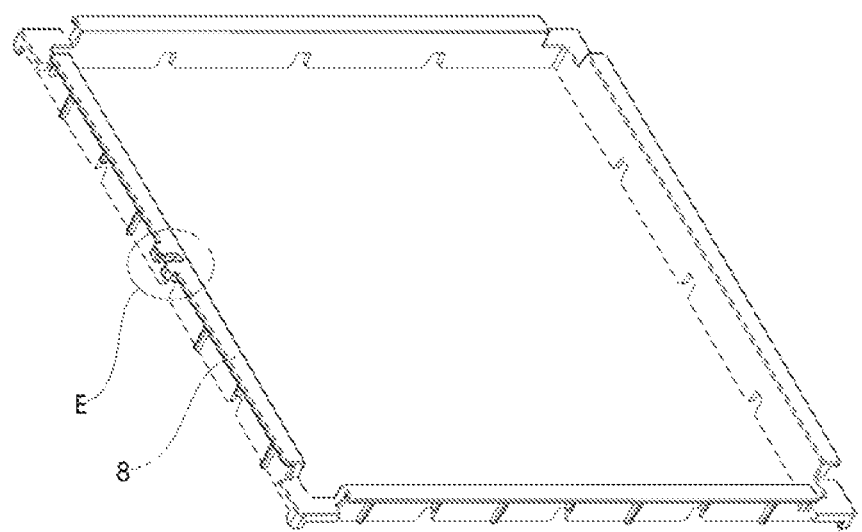
FIG. 12 is a schematic structural view of a frame of the environmental protection storage unit according to the embodiment of the present invention.
Figure 13:
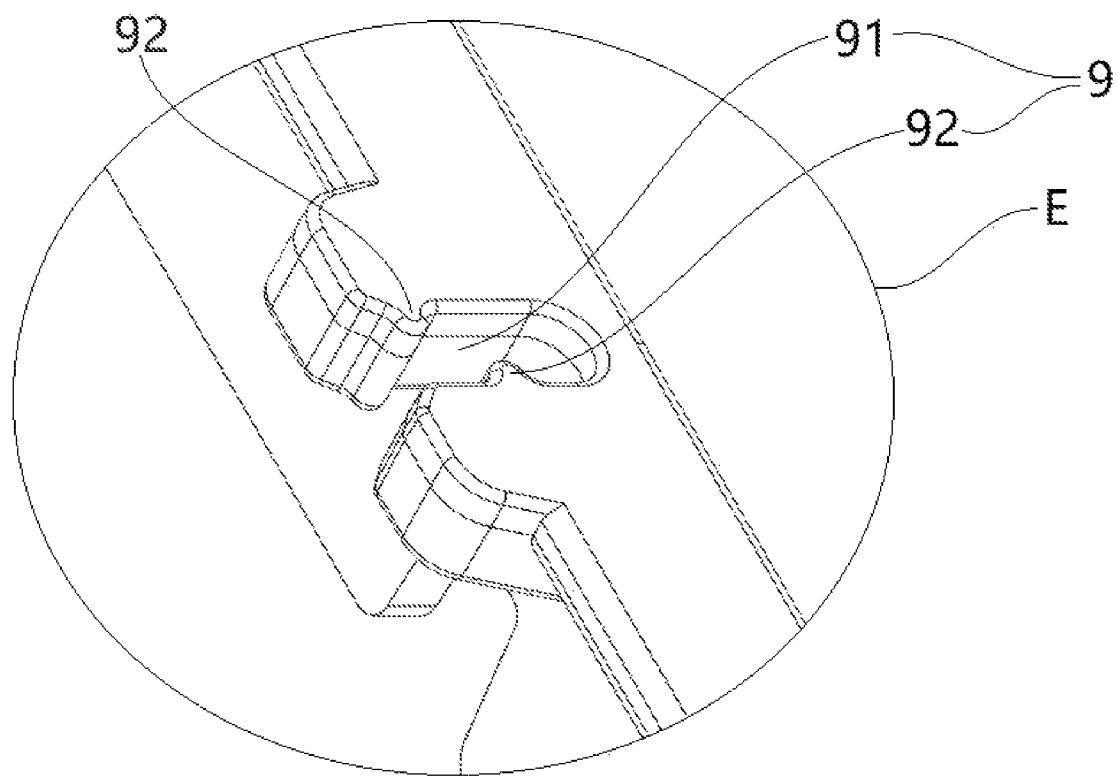
FIG. 13 is an enlarged view of E part of FIG. 11 according to the embodiment of the present invention.

Referring to FIGS. 12 and 13, in order to prevent the garbage bag from falling off the frame 8, the following design has been carried out in this embodiment. Specifically, the frame 8 is further provided with a clamping part 9 for clamping the garbage bag.

The clamping part 9 includes a slot 91 and two clamping blocks 92. The slot 91 is communicated from a top to a bottom thereof and arranged on the side of the frame 8 near the cover 12. The two clamping blocks 92 are located on opposite sides of the slot 91 and are misaligned with each other. Based on the above scheme, one side of the folding part of the garbage bag can be roughly folded into a bundle, and then this bundle of the folding part of the garbage bags can be clamped into the slot 91. The two clamping blocks 92 can prevent it from detaching from the slot 91, and this bundle of the folding part of the garbage bags will naturally spread and press against the slot 91 under the action of elasticity, thereby causing the garbage bag to be clamped tightly at the clamping part 9.

It is noted that the terminology used herein is for the purpose of describing particular embodiments only and is not intended to limit the exemplary embodiments according to the present application. As used herein, singular forms are intended to include plural forms unless the context clearly dictates otherwise, and it should also be understood that when the terms of "include" are used in this specification, they specify the presence of features, steps, operations, devices, components, and/or combinations thereof.

In addition, it should be noted that the words "first" and "second" are used to define the parts only for the convenience of distinguishing the corresponding parts. Unless otherwise stated, the above words have no special meaning, so they cannot be construed as limiting the scope of protection of the present application.

While embodiments of the present invention have been shown and described, it will be understood by those skilled in the art that various changes, modifications, substitutions and variations may be made to these embodiments without departing from the principles and spirit of the invention, the scope of which is defined by the appended claims and their equivalents.

What is claimed is:

1. An environmental protection storage device, comprising:
    a plurality of environmental protection storage units, each of the environmental protection storage unit comprising a plurality of connecting parts; and
    a plurality of connecting pieces, each of the connecting pieces configured for connecting the connecting parts of adjacent would be configured to spread environmental protection storage units, thereby the environmental protection storage units are interconnected;
    wherein each environmental protection storage unit comprises a bucket body having a first opening at a side thereof and a cover detachably connected to the bucket body and corresponding to the first opening for opening and closing the first opening; a second opening being arranged on the cover, and configured for receiving garbage;
    the environmental protection storage device further comprises a plurality of supporting pieces respectively arranged at multiple edges and corners within the bucket body and a frame detachably connected to the supporting pieces for installing garbage bags, and a gap being arranged between the top of the supporting pieces and the top of the bucket body and corresponding to a bottom of the second opening;
    the frame is provided with a clamping part for clamping the garbage bag;
    wherein the clamping part comprises:
        a slot, the slot being communicated from a top to a bottom thereof and arranged on the side of the frame near the cover; and
        two clamping blocks, the two clamping blocks being located on opposite sides of the slot and being misaligned with each other in a manner that one side of a folding part of the garbage bag can be folded into a bundle, and the bundle of the folding part of the garbage bag can be clamped into the slot, the two clamping blocks prevent the garbage bag from detaching from the slot, and the bundle of the folding part of the garbage bag would spread and press against the slot under the action of elasticity, thereby causing the garbage bag to be clamped tightly at the clamping part.

2. The environmental protection storage device according to claim 1, wherein the bucket body comprises:
    three side plates, the three side plates being vertically arranged, and adjacent the side plates can be detachably connected and perpendicular to each other;
    a top plate, the top plate being detachably connected to a top of the three side plates; and
    a bottom plate, the bottom plate being detachably connected to a bottom of the three side plates, the bottom plate in conjunction with the top plate and the three side plates enclosing a rectangular accommodating space remaining the second opening at the side of the cover.

3. The environmental protection storage device according to claim 2, wherein each connecting piece ting piece comprises a first and a second connecting piece, the connecting part comprises:
    a first connecting part, the first connecting part being arranged on the top plate, and the first connecting parts on adjacent the environmental protection storage units being connected through the first connecting piece; and
    a second connecting part, the second connecting part being arranged on the bottom plate, and the second connecting parts on adjacent the environmental protection storage units being connected through the second connecting piece.

4. The environmental protection storage device according to claim 1, wherein one side of the cover is rotationally connected to the bucket body, and an opposite side is buckle connected to the bucket body.

5. The environmental protection storage device according to claim 4, wherein a limiting block and a clamping protrusion are provided at the first opening, with the limiting block and the clamping protrusion being arranged parallel to each other and spaced from each other; and the cover is provided with a clamping strip corresponding to the clamping protrusion, the clamping strip and the clamping protrusion being made of elastic material, enabling the clamping strip to move between the limiting block and the clamping protrusion as the cover rotates.

6. The environmental protection storage device according to claim 1, wherein at least one of the pupporting pieces is provided with a vertical connecting hole, and a bottom of the frame is provided with a connecting rod corresponding to the connecting hole, the connecting rod can be inserted into the connecting hole to allow the frame and the supporting piece to be inserted and pulled out and connected.

* * * * *